(12) United States Patent
Zhuang et al.

(10) Patent No.: US 10,823,564 B2
(45) Date of Patent: Nov. 3, 2020

(54) AUTOMATIC LEVELING LASER MARKING INDICATION DEVICE

(71) Applicant: Zhejiang Rongsheng Tools Co., Ltd., Jinhua, Zhejiang (CN)

(72) Inventors: Chengrong Zhuang, Zhejiang (CN); Zhiwei Zhuang, Zhejiang (CN)

(73) Assignee: Zhejiang Rongsheng Tools Co., Ltd., Jinhua, Zhejiang (CN)

( * ) Notice: Subject to any disclaimer, the term of this patent is extended or adjusted under 35 U.S.C. 154(b) by 203 days.

(21) Appl. No.: 16/002,504

(22) Filed: Jun. 7, 2018

(65) Prior Publication Data
US 2019/0162535 A1    May 30, 2019

(30) Foreign Application Priority Data

Nov. 30, 2017    (CN) ...................... 2017 2 1646685 U

(51) Int. Cl.
*G01C 15/00*    (2006.01)
*G01C 15/10*    (2006.01)
*F21V 8/00*    (2006.01)

(52) U.S. Cl.
CPC ......... *G01C 15/004* (2013.01); *G01C 15/105* (2013.01); *G02B 6/0001* (2013.01)

(58) Field of Classification Search
CPC ... G01C 9/32; G01C 9/06; G01C 1/00; G01C 2009/062; G01C 2009/066; G01C 2009/068; G01C 7/00; G01C 9/12; G01C 9/18; G01C 15/004; G01C 15/105; G01B 21/22; G01B 11/26; G01B 3/56; G01B 5/24; G01B 7/30

USPC .................................................. 33/291, 286
See application file for complete search history.

(56) References Cited

U.S. PATENT DOCUMENTS

| 5,994,688 | A | * | 11/1999 | Jackson | G01C 15/004 250/206.2 |
|---|---|---|---|---|---|
| 6,043,879 | A | * | 3/2000 | Dong | G01C 15/004 33/291 |
| 6,088,623 | A | * | 7/2000 | Yowler | G01C 15/004 356/248 |
| 7,031,367 | B2 | * | 4/2006 | Marshall | G01C 9/12 33/281 |
| 7,059,057 | B2 | * | 6/2006 | Raskin | G01C 15/004 33/281 |
| 7,111,406 | B2 | * | 9/2006 | Sergyeyenko | G01C 15/002 33/291 |

(Continued)

*Primary Examiner* — Yaritza Guadalupe-McCall
(74) *Attorney, Agent, or Firm* — Novick, Kim & Lee, PLLC; Allen Xue

(57) ABSTRACT

The application provides an automatic leveling laser marking indication device, comprising a housing, a display mechanism, a laser seat mounted with a laser, a sensor seat mounted with a sensor, and a base connected with the housing, wherein the display mechanism is mounted at a top of the housing via a display seat, the laser seat and the sensor seat are mounted inside the housing and are connected with each other, the sensor seat is mounted at the base, the display mechanism comprises a first light emitting window disposed at the top of the display seat and second light emitting windows disposed around the display seat, and the interior of the display seat is mounted with a LED light. According to the application, the markings of horizontal and vertical lines can be accurately positioned only by adjusting the angle of product to be ≤5°.

12 Claims, 3 Drawing Sheets

(56) References Cited

U.S. PATENT DOCUMENTS

| | | | | |
|---|---|---|---|---|
| 7,181,853 B2* | 2/2007 | Heger | ............... | G01C 15/00 33/281 |
| 7,392,591 B2* | 7/2008 | Milligan | ............... | B25H 7/04 33/281 |
| 7,513,052 B2* | 4/2009 | Milligan | ............... | G01C 15/004 33/228 |
| 9,188,441 B2* | 11/2015 | Munroe | ............... | G01C 15/006 |
| 9,222,772 B2* | 12/2015 | Munroe | ............... | G01C 15/006 |
| 2004/0107589 A1* | 6/2004 | Ohtomo | ............... | G01C 15/002 33/290 |
| 2005/0005462 A1* | 1/2005 | Heger | ............... | G01C 15/00 33/286 |
| 2007/0139925 A1* | 6/2007 | Milligan | ............... | G02B 27/20 362/259 |
| 2007/0153532 A1* | 7/2007 | Milligan | ............... | G01C 15/004 362/362 |
| 2008/0078091 A1* | 4/2008 | McCracken | ............... | G01C 15/004 33/291 |
| 2014/0182147 A1* | 7/2014 | Munroe | ............... | G01C 9/02 33/275 R |
| 2014/0202011 A1* | 7/2014 | Munroe | ............... | G01J 1/44 33/228 |
| 2019/0162535 A1* | 5/2019 | Zhuang | ............... | G01C 15/004 |

* cited by examiner

AUTOMATIC LEVELING LASER MARKING INDICATION DEVICE

This application claims the benefit of priority to Chinese Patent Application No. 201721646685.2 titled "Automatic Leveling Laser Marking Indication Device", filed with the Chinese State Intellectual Property Office on Nov. 30, 2017, the entire disclosure of which is incorporated herein by reference.

TECHNICAL FIELD

The application relates to the technical field of laser measuring tool, and in particular to an automatic leveling laser marking indication device.

BACKGROUND

During operations such as housing decoration, repair and article installation or the like, it is often required to perform marking and corrections on objects in terms of their horizontal and vertical statuses, etc. Existing automatic leveling laser marking level device can realize automatic leveling within a range of relative angle; if the horizontal and vertical lines reach an accurate range, a green LED is turned on, and if the horizontal and vertical lines do not reach an accurate range, a red LED is turned on. However, during use, these devices can only determine the levelness of a base of the automatic leveling laser marking level device and the accuracies of the vertical and horizontal lines by reading the level of bubble. There are problems of inconvenient use and inaccurate accuracies.

SUMMARY

An object of the application is to at least address the above defects and shortages. The object is realized by the following technical solutions.

The application provides an automatic leveling laser marking indication device, comprising a housing, a display mechanism, a laser seat mounted with a laser, a sensor seat mounted with a sensor, and a base connected with the housing, wherein the display mechanism is mounted at a top of the housing via a display seat, the laser seat and the sensor seat are mounted inside the housing and are connected with each other, the sensor seat is mounted at the base, the display mechanism comprises a first light emitting window disposed at the top of the display seat and second light emitting windows disposed around the display seat, and the interior of the display seat is mounted with a LED light.

Preferably, the housing, the laser seat, the sensor seat and the display seat have the same axis.

Preferably, the first light emitting window has a double square shape.

Preferably, the second light emitting windows have a unitary structure or a split structure.

Preferably, the display mechanism is a LED light guide lens.

Preferably, the LED light is a LED red-green dual-color light emitting tube.

Preferably, the sensor seat is fixed onto the base via bolts, and the display seat is fixedly connected to the housing via bolts.

Preferably, a bottom of the housing is provided with a USB charging interface.

Preferably, the display seat is inserted into an upper portion of the housing.

Preferably, the base is inserted into a lower portion of the housing.

The application has the following advantages.

In view of the inconveniences caused by automatic leveling laser marking level device, the application provides a high precision dual-color LED conversion indication device. The markings of horizontal and vertical lines can be accurately positioned only by adjusting the angle of product to be ≤5°. Meanwhile, an automatic conversion prompt is realized by displaying lights with different colors at the top. The problem of insufficient accuracy caused by usually forgetting to check the bubble is addressed, the use is convenient, and the measurement accuracy is high.

BRIEF DESCRIPTION OF THE DRAWINGS

Upon reading the detailed description of the preferred embodiments below, various other advantages and benefits will become obvious to those skilled in the art. The drawings are only provided for illustrating the purpose of the preferred embodiments and are not intended to limit the present application. Throughout the drawings, identical reference signs are used to denote identical parts.

1—housing; 11—base; 21—first light emitting window; 22—second light emitting windows; 3—display seat; 4—laser seat; 5—sensor seat; 6—LED light; 7—USB charging interface

DETAILED DESCRIPTION

The exemplary embodiments of the disclosure will be described in further detail below with reference to the drawings. Although the drawings show exemplary embodiments of the disclosure, it should be understood that the disclosure may be implemented in various forms, and should not be limited to the embodiments set forth herein. On the contrary, these embodiments are provided to enable a more thorough understanding of the disclosure, and to completely convey the scope of the disclosure to those skilled in the art.

Figure 1:
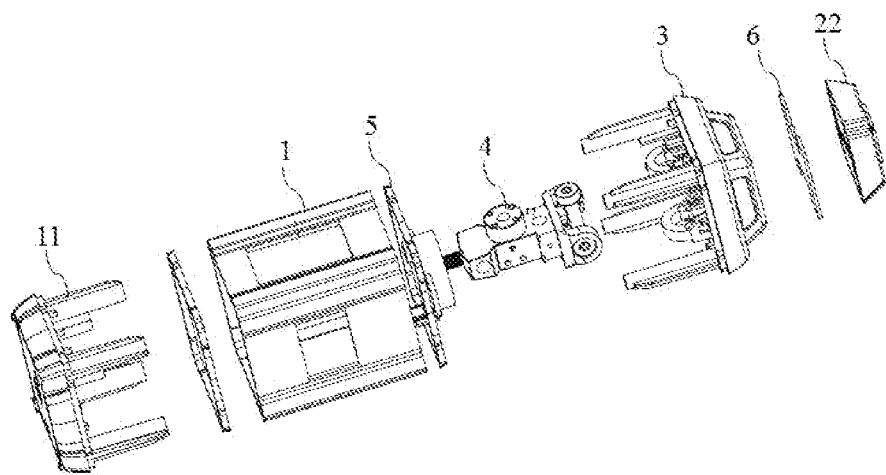
FIG. 1 is a schematic exploded structure view of an automatic leveling laser marking indication device provided by an embodiment of the application.
Figure 2:
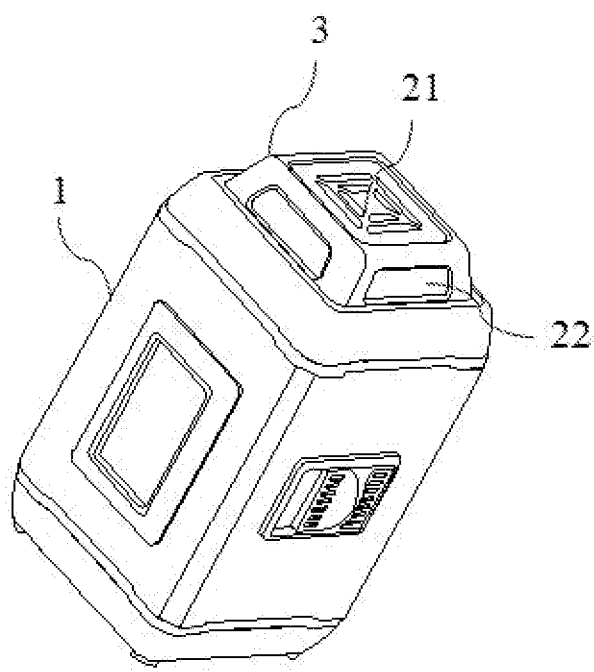
FIG. 2 is a schematic structure view of the automatic leveling laser marking indication device provided by the embodiment of the application.
Figure 3:
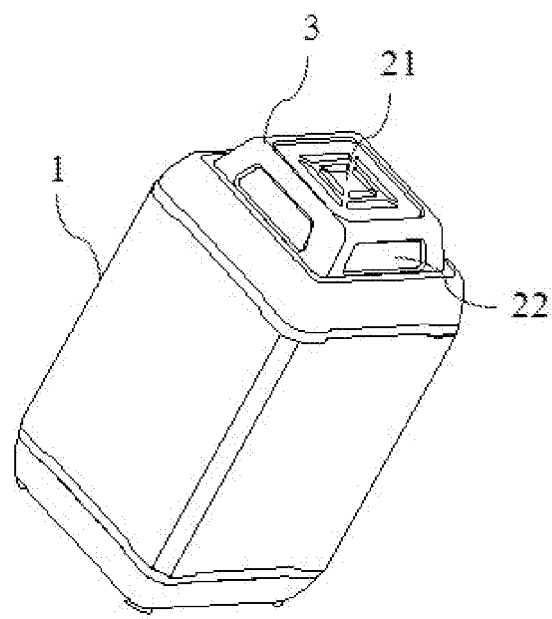
FIG. 3 is a schematic structure view of the light emitting windows of the automatic leveling laser marking indication device provided by the embodiment of the application.
Figure 4:
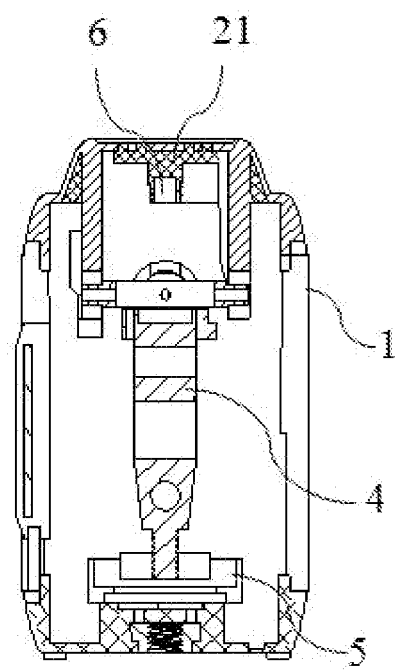
FIG. 4 is a sectional view of the automatic leveling laser marking indication device provided by the embodiment of the application.
Figure 5:
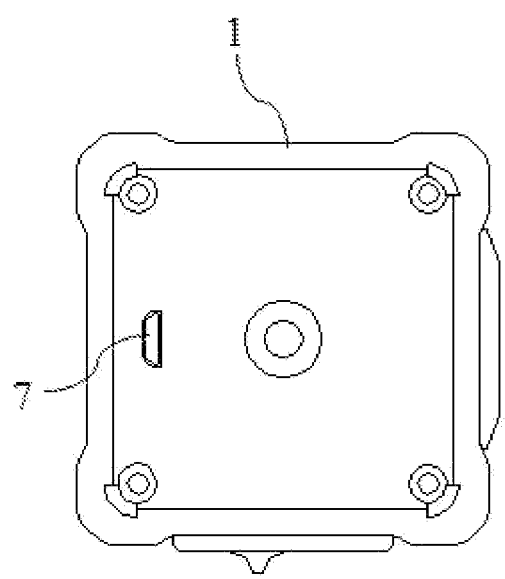
FIG. 5 is a schematic bottom view of the automatic leveling laser marking indication device provided by the embodiment of the application.

FIGS. 1 to 5 show schematic structure views of an automatic leveling laser marking indication device provided by an embodiment of the application. As shown in FIGS. 1 to 5, the device comprises a housing 1, a LED light guide lens, a laser seat 4 mounted with a laser, a sensor seat 5 mounted with a sensor, and a base 11 connected with the housing 1, wherein the LED light guide lens is mounted at the top of the housing 1 through the display seat 3, the display seat 3 is inserted into an upper portion of the housing 1 and is fixedly connected to the housing 1 via bolts; the laser seat 4 and the sensor seat 5 are mounted inside the housing 1 and are connected with each other; the laser seat 4 is mounted with a laser head capable of emitting horizontal and vertical lines; the sensor seat 5 is fixedly mounted at the base 11 via bolts, the base 11 is inserted into a lower portion of the housing 1; and the housing 1, the laser seat 4, the sensor seat 5 and the display seat 3 have the same axis.

The LED light guide lens comprises a first light emitting window 21 disposed at the top of the display seat 3 and second light emitting windows around the display seat 3, and red-green dual-color LED light 6 is mounted at a middle portion of the display seat 3.

The second light emitting windows 22 may have a unitary structure or also a split structure. The application has no limitations to this. In a preferred embodiment, four light emitting panels of the second light emitting windows 22 are configured to be a unitary structure, and are assembled together with the display seat 3 which matches with the panels.

In addition, a bottom of the housing is provided with a USB charging interface 7 for charging the automatic leveling laser marking indication device.

The operational principle of the application is explained as follows.

A red/green color conversion function of the LED light 6 is realized in the following manner: the laser seat 4 automatically swings, and after a horizontal position is found, the sensor seat 5 transmits a signal instruction to the LED light 6 by reflection.

When the product is at an angle ≤5°, the sensor seat 5 transmits a signal instruction to the LED light 6 by reflection. At this point, the LED light 6 turns green from red. Such a status indicates that the horizontal laser lines and vertical laser lines of the automatic leveling laser marking indication device have reached horizontal and vertical statuses, and are in a normal use state.

When the product is at an angle ≥5°, the sensor seat 5 transmits a signal instruction to the LED light 6 by reflection. At this point, the LED light 6 turns red from green. Such a status indicates that the horizontal laser lines and vertical laser lines of the automatic leveling laser marking indication device are not in horizontal and vertical statuses, and are in flickering status. At this point, the product cannot be used normally.

In practical operation, the first light emitting window 21 and second light emitting windows 22 emit lights simultaneously. Such an arrangement facilitates recognition and use, and can realize a fast prompt function.

The second light emitting windows 22 mounted around the display seat 3 can not only highlight the LOGO of the product, but also can display laser warning signs, laser warning texts, technical parameters of product, etc. In a preferred embodiment, the second light emitting windows 22 highlight the laser warning signs or laser warning texts, and can warn the user not to look at the laser directly for preventing the eyes from damage.

In view of the inconveniences caused by automatic leveling laser marking level device, the application provides a high precision dual-color LED conversion indication device. The markings of horizontal and vertical lines can be accurately positioned only by adjusting the angle of product to be ≤5°. Meanwhile, an automatic conversion prompt is realized by displaying lights with different colors at the top. The problem of insufficient accuracy caused by usually forgetting to check the bubble is addressed, the use is convenient, and the measurement accuracy is high.

It is noted that terms "first" and "second" in the description of the application are merely used to distinguish one entity or operation from another entity or operation, and do not necessarily require or imply that these entities or operations have any such an actual relationship or order therebetween.

Described above are merely specific preferred embodiments of the application. However, the scope of protection of the application is not limited to this.

Described above are preferred particular embodiments of the application, but the scope of protection of the application is not limited thereto. Various modifications and alternations that can be readily conceived by those skilled in the art without deviation from the technical scope disclosed by the application will fall within the scope of protection of the application. Therefore, the scope of protection of the application should be defined by the scope of protection of the appended claims.

The invention claimed is:

1. An automatic leveling laser marking indication device, comprising: a housing, a display mechanism, a laser seat mounted with a laser, a sensor seat mounted with a sensor, and a base connected with the housing, wherein the display mechanism is mounted at a top of the housing via a display seat, the laser seat and the sensor seat are mounted inside the housing and are connected with each other, the sensor seat is mounted at the base, the display mechanism comprises a first light emitting window disposed at the top of the display seat and second light emitting windows disposed around the display seat, and the interior of the display seat is mounted with a LED light, wherein the LED light is configured to emit green light when the automatic leveling laser marking indication device is positioned at an angel at or smaller than a predetermined value from a horizontal position and to emit red light when the automatic leveling laser marking indication device is positioned at an angle larger than the predetermined value.

2. The automatic leveling laser marking indication device according to claim 1, wherein the housing, the laser seat, the sensor seat and the display seat have the same axis.

3. The automatic leveling laser marking indication device according to claim 1, wherein the first light emitting window has a double square shape.

4. The automatic leveling laser marking indication device according to claim 1, wherein the second light emitting windows have a unitary structure or a split structure.

5. The automatic leveling laser marking indication device according to claim 1, wherein the display mechanism is a LED light guide lens.

6. The automatic leveling laser marking indication device according to claim 1, wherein the LED light is a LED red-green dual-color light emitting tube.

7. The automatic leveling laser marking indication device according to claim 1, wherein the sensor seat is affixed to the base via bolts, and the display seat is affixed to the housing via bolts.

8. The automatic leveling laser marking indication device according to claim 1, wherein a bottom of the housing is provided with a USB charging interface.

9. The automatic leveling laser marking indication device according to claim 1, wherein the display seat is inserted into an upper portion of the housing.

10. The automatic leveling laser marking indication device according to claim 1, wherein the base is inserted into a lower portion of the housing.

11. The automatic leveling laser marking indication device according to claim 1, wherein the predetermined value is 5 degree from a horizontal position.

12. The automatic leveling laser marking indication device according to claim 11, wherein the sensor detects the value of the angle and transmits a corresponding signal to the LED light by reflection to switch the LED light from green to red or from red to green.

\* \* \* \* \*